US008999420B2

(12) United States Patent
Hansen

(10) Patent No.: US 8,999,420 B2
(45) Date of Patent: Apr. 7, 2015

(54) MACHINE, SYSTEM USING SAID MACHINE, AND METHOD FOR PREPARING A BEVERAGE OR FOOD

(76) Inventor: Nick Andrew Hansen, Banbury (GB)

( * ) Notice: Subject to any disclaimer, the term of this patent is extended or adjusted under 35 U.S.C. 154(b) by 0 days.

(21) Appl. No.: 14/007,777

(22) PCT Filed: Mar. 30, 2012

(86) PCT No.: PCT/GB2012/050729
§ 371 (c)(1),
(2), (4) Date: Sep. 26, 2013

(87) PCT Pub. No.: WO2012/160342
PCT Pub. Date: Nov. 29, 2012

(65) Prior Publication Data
US 2014/0079853 A1    Mar. 20, 2014

(30) Foreign Application Priority Data

May 24, 2011 (GB) .................................. 1108759.0

(51) Int. Cl.
*A47J 31/40* (2006.01)
*A47J 31/36* (2006.01)
*A47J 31/44* (2006.01)
*B65D 85/804* (2006.01)

(52) U.S. Cl.
CPC ............ *A47J 31/407* (2013.01); *A47J 31/3623* (2013.01); *A47J 31/4496* (2013.01); *B65D 85/8043* (2013.01)

(58) Field of Classification Search
USPC ................... 426/425, 431, 432, 433, 435, 77; 99/283, 295, 302 P
See application file for complete search history.

(56) References Cited

U.S. PATENT DOCUMENTS

| 5,402,707 A * | 4/1995 | Fond et al. ...................... 99/295 |
| 8,807,018 B2 * | 8/2014 | Doleac et al. .................... 99/295 |
| 2007/0186784 A1 | 8/2007 | Liverani et al. |
| 2008/0264267 A1 | 10/2008 | Doglioni Majer |

(Continued)

FOREIGN PATENT DOCUMENTS

| DE | 102009007553 A1 | 8/2010 |
| EP | 1319357 A2 | 6/2003 |
| WO | 2008116818 A1 | 10/2008 |
| WO | 2009115475 A1 | 9/2009 |
| WO | 2010089106 A1 | 8/2010 |

(Continued)

OTHER PUBLICATIONS

English Translation for DE 102009007553 published Aug. 2010.*

(Continued)

*Primary Examiner* — Anthony Weier
(74) *Attorney, Agent, or Firm* — Fitch, Even, Tabin & Flannery LLP

(57) ABSTRACT

This disclosure relates to improvements in beverage/food product preparation systems and in particular to beverage/food product preparation systems having machines of the type which use pre-packaged cartridges containing beverage or food ingredients. The cartridge (30) contains one or more beverage or food ingredients for use in a machine for preparing a beverage or food product from said ingredients. The cartridge (30) includes a base (34), an outlet aperture (37) in the base (34), and a collar (38) extending from the cartridge base (34) around the outlet aperture (37). The cartridge (30) is inserted into a holding receptacle (14) of a machine the collar (38) interacts with an element (65) of the machine and the collar (38) is configured to determine the pressure in the cartridge (30) during the preparation process.

22 Claims, 8 Drawing Sheets

(56) References Cited

U.S. PATENT DOCUMENTS

2009/0007792 A1 1/2009 Glucksman et al.
2010/0034929 A1 2/2010 Dogan et al.
2010/0064899 A1 3/2010 Aardenburg

FOREIGN PATENT DOCUMENTS

WO 2010093246 A1 8/2010
WO 2010134036 A1 11/2011
WO 2012048728 A1 4/2012

OTHER PUBLICATIONS

English Translation for EP 1319357 published Jun. 2003.*
International Search Report for PCT/GB2012/050729, mailed Jun. 22, 2012 (5 pgs.).
Written Opinion of the International Search Report for PCT/GB2012/050729, mailed Jun. 22, 2012 (6 pgs.).
International Preliminary Report on patentability for PCT/GB2012/050729, dated May 31, 2013 (5 pgs.).
UK Intellectual Property Office, Combined Search and Examination Report for GB1108759.0, dated Sep. 26, 2011 (8 pgs.).
Letter from Boult Wade Tennant, dated Mar. 29, 2012, to UK Intellectual Property Office in response to Combined Search and Examination Report for GB1108759.0 (12 pgs.).
UK Intellectual Property Office, Examination Report for GB1108759.0, dated Jul. 30, 2012 (2 pgs.).
Letter from Boult Wade Tennant, dated Aug. 6, 2012, to UK Intellectual Property Office in response to Examination Report for GB1108759.0 (12 pgs.).
UK Intellectual Property Office, Notification of Grant, dated Jun. 11, 213 for GB1108759.0 (2 pgs.).

* cited by examiner and Kingdom 
MACHINE, SYSTEM USING SAID MACHINE, AND METHOD FOR PREPARING A BEVERAGE OR FOOD

CROSS REFERENCE TO RELATED APPLICATIONS

This application is a U.S. national phase application of International Application No. PCT/GB2012/050729, filed Mar. 30, 2012, which claims benefit from United Kingdom Application No. 1108759.0, filed May 24, 2011, both of which are hereby incorporated herein by reference in their entirety.

This disclosure relates to improvements in beverage/food product preparation systems and in particular to beverage/food product preparation systems comprising machines of the type which use pre-packaged cartridges containing beverage or food ingredients.

BACKGROUND

Beverage preparation systems typically comprise a beverage preparation machine and disposable cartridges (also known as pods or capsules) for forming single servings of beverage. The cartridges for use with such systems are pre-packed with beverage ingredients and are sealed prior to use. In use the cartridges are pierced during or after insertion into the beverage preparation machine so as to form an inlet for aqueous medium, such as water, to enter the cartridges and beverage to exit the cartridges. The use of such systems can be extended to the preparation of certain types of food products, such as milk based desserts and the like.

Most of the machines require specially designed cartridges of a complex design and a particular specification of materials to cope with the high pressures involved in the preparation process, especially for espresso beverages as it is generally the internal geometry of the cartridge which enables the desired quality of the beverage/food product to be produced under high pressure.

Alternatively the preparation parameters have to be preselected by the operator.

It is now proposed to use the interface between the cartridge and the machine to determine the parameters of the preparation process, such as the pressure.

SUMMARY

Accordingly, the present disclosure provides a cartridge containing one or more beverage or food ingredients for use in a machine for preparing a beverage or food product from said ingredients;

said cartridge comprising a base, an outlet aperture in the base, and a collar extending from the cartridge base around the outlet aperture;

wherein when the cartridge is inserted into a holding receptacle of a machine the collar interacts with an element of the machine and the collar is configured to determine the pressure in the cartridge during the preparation process.

The cartridge collar preferably comprises one or more gaps which may be formed by castellations in the cartridge collar.

Alternatively the cartridge collar comprises no gaps.

Preferably the cartridge outlet aperture is sealed by sealing means prior to use.

The present disclosure also provides a machine for preparing beverage or food products from a cartridge containing one or more ingredients, said machine comprising:

a holding receptacle for receiving and holding a cartridge during the preparation process;

preferably the machine element comprises wherein the machine has an element which interacts with the collar of the cartridge when the cartridge is inserted into the holding receptacle;

such that collar is configured to determine the pressure in the cartridge during the preparation process by virtue of it's interaction with the machine element.

valve means located downstream of the holding receptacle, which valve means open at a predetermined pressure, said valve means comprising a piston normally biased into a closed position in which it is contactable with the collar of a cartridge inserted, in use into the holding receptacle.

Preferably the machine element comprises valve means formed downstream of the holding receptacle, which valve means open at a predetermined pressure, said valve means being formed by the collar of a cartridge inserted, in use, into the holding receptacle and normally biased into its first position in which it is contactable with an element of the machine.

Preferably the valve means further comprise piercing means for piercing the cartridge when it is inserted into the holding receptacle.

The present disclosure also provides a system for preparing beverage or food products comprising a machine and at least one cartridge;

The one or more gaps in the cartridge collar preferably cause the valve to open at a first pressure.

The lack of gaps in the cartridge collar preferably cause the valve to open at a second pressure which is preferably higher than the first pressure.

Preferably the piston is biased by spring means into the closed position.

An upper surface of the piston may contact a lower surface of the cartridge collar when in the closed position.

Preferably at least a portion of the upper surface of the piston and of the lower surface of the cartridge collar are angled at substantially the same angle to the horizontal.

The piercing means are preferably provided with at least one means to provide a liquid flow path such that when the cartridge sealing means has been pierced liquid is able to flow from an interior of the cartridge, along the piercing means and into a chamber formed by the collar the sealing means and the upper surface of the piston.

Preferably when a pressure in the chamber is greater than the spring force of the spring means, the piston moves out of contact with the collar into an open position.

The present disclosure preferably provides a method of preparing a beverage or food product comprising the steps of:
  selecting a cartridge;
  inserting the cartridge into a holding receptacle of a machine;
  piercing the cartridge with the piercing means; and
  supplying a liquid to the holding receptacle so as to pass the liquid through the cartridge to form the beverage or food product.

Whereas known machines, which utilise a valve assembly to modify the operating pressure, require the operating pressure variations to be set by manual or drive means or some form of recognition system, in this system it is the interface between the cartridge and the outlet of the machine which controls the operation of the valve. Consequently, if the external geometry of an element of the interface is changed, namely the cartridge collar, this can automatically effect the required pressure change, without the need for the user to do anything. Thus the machines can be manufactured with a predefined peak opening pressure, whereas the actual operating pressure is defined by the cartridge inserted into the machine.

DETAILED DESCRIPTION

Preferred embodiments of a system for preparing beverage and food products will now be described, by way of example only, with reference to the accompanying drawings in which.

The system for preparing beverage and food products described herein comprises a machine for preparing beverage and food products and one or more cartridges containing one or more beverage or food ingredients for use in the machine. In order to cater for a selection of beverage and food types, requiring different pressures during the preparation process, the interface between the machine and the cartridge is such as to enable beverage and food products to be prepared at at least two, and more preferably a range of, different pressures without user intervention. This is preferably achieved by providing the machine with a valve downstream of where the cartridge is located and operation of the valve is determined by the interface between the cartridge and the valve, as described below.

Figure 1:
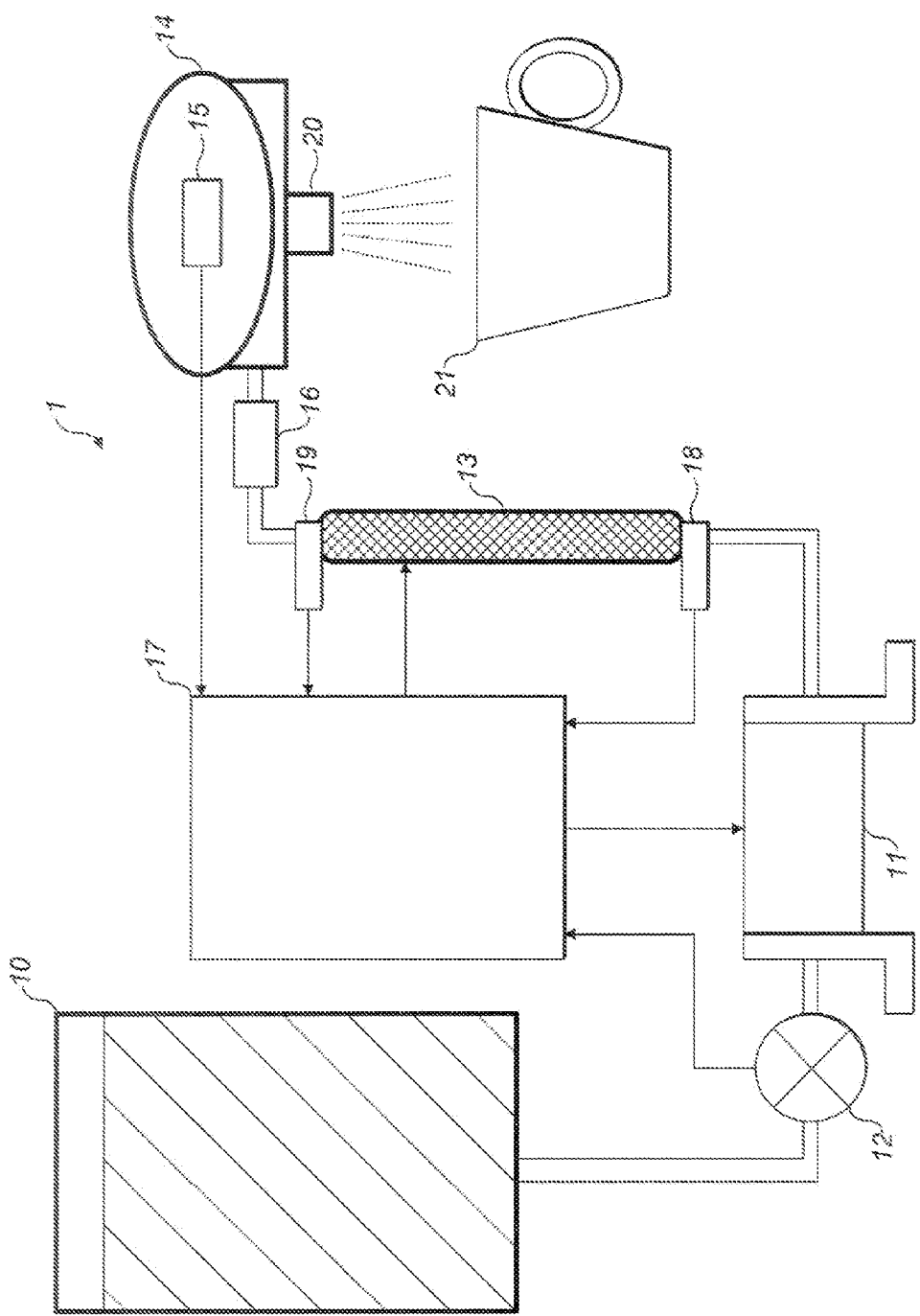
FIG. 1 is a schematic diagram illustrating the system for preparing beverage and food products.

The system 1 for preparing beverages or food products is illustrated schematically in FIG. 1. The machine part of the system 1 generally comprises a reservoir 10 for a liquid. Although water is likely to be the most common liquid used in preparing beverages such as coffee, the machine is also capable of handling other liquids, such as milk or milk preparations, for mixing with the beverage or food ingredients. Any references herein to water should also be taken to include any form of liquid used in preparing beverages or food products. The reservoir 10 is fluidly connected to a pump 11, via a flow meter 12, which in turn is connected to a water heater 13. The water heater 13 is fluidly connected to the brew head 14. It should be noted that the system of the present disclosure is not limited to preparing products which must be "brewed"; the use of the term "brew head" is for convenience only as it originated from machines which were limited to brewing beverages. The brew head 14 includes a cartridge recognition device 15, which will be described in more detail below.

A valve 16 is located in the conduit which provides the fluid path between the water heater 13 and the brew head 14. The valve 16 may be an expansion/contraction valve. If the pressure of the liquid flow is acceptable, the liquid is passed to the cartridge 30. If the pressure is below or above predetermined limits then the liquid flow can be prevented by the valve.

The brew head 14 generally comprises a cartridge holder (not shown) for holding, in use, a cartridge 30. The brew head 14 further comprises means, such as inlet and outlet piercers, for forming in the cartridge 30, in use, an inlet for liquid to enter the cartridge 30 and an outlet for the prepared beverage to exit the cartridge 30.

The flow meter 12, the pump 11, the water heater 13 and the brew head 14 (and other components) are connected to an electronic controller 17. In addition water temperature monitors 18,19 located at the inflow to and the outflow from the water heater 13, are also connected to the controller 17.

The operational behavior of the machine is determined by software embedded in the controller 17, for example as described in EP-A-1440644. The memory of the control processor includes one or more variables for one or more operational parameters for the machine. These typically include the temperature of the liquid to be passed through the cartridge 30 during the operating stage, the optimum speed of charging the cartridge 30, the presence or otherwise of a soak step, the total dispensed volume of the beverage or food product, the flow rate of the liquid during the discharge stage, and the period of the purge stage.

Figure 2:
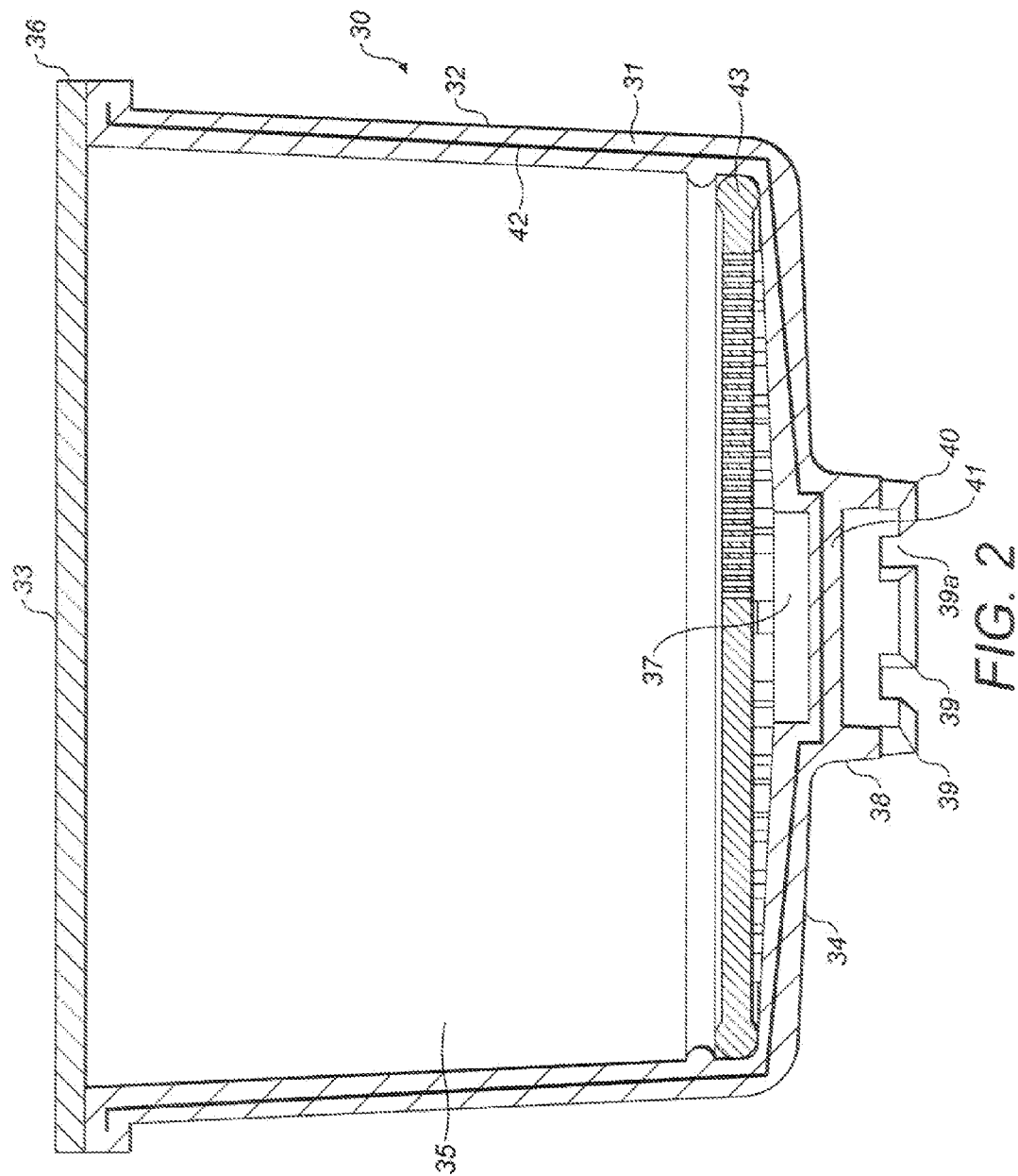
FIGS. 2 and 4 are cross sectional side elevations of two cartridges used in the system of FIG. 1.
Figure 3:
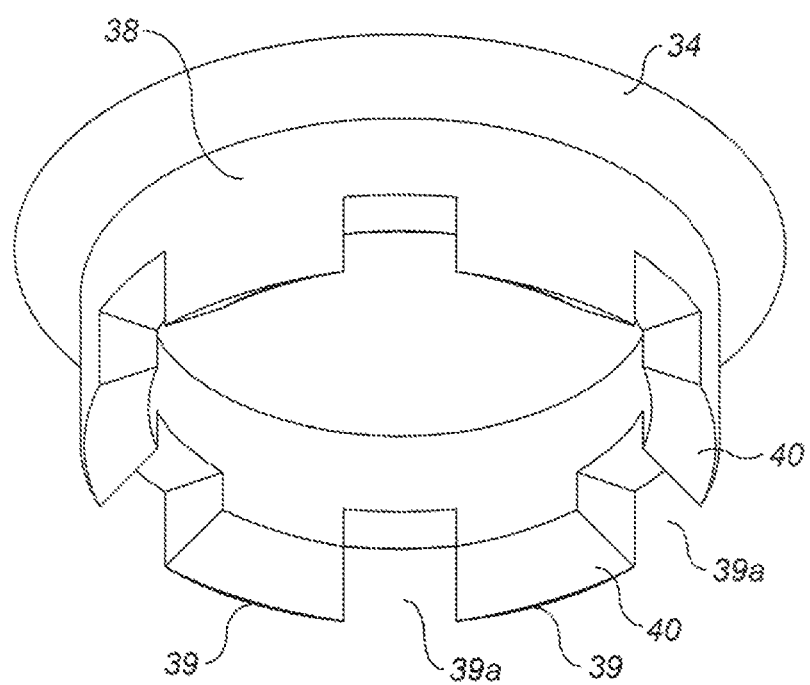
FIGS. 3 and 5 are pictorial views of the collars of the cartridges of FIGS. 2 and 4 respectively.
Figure 4:
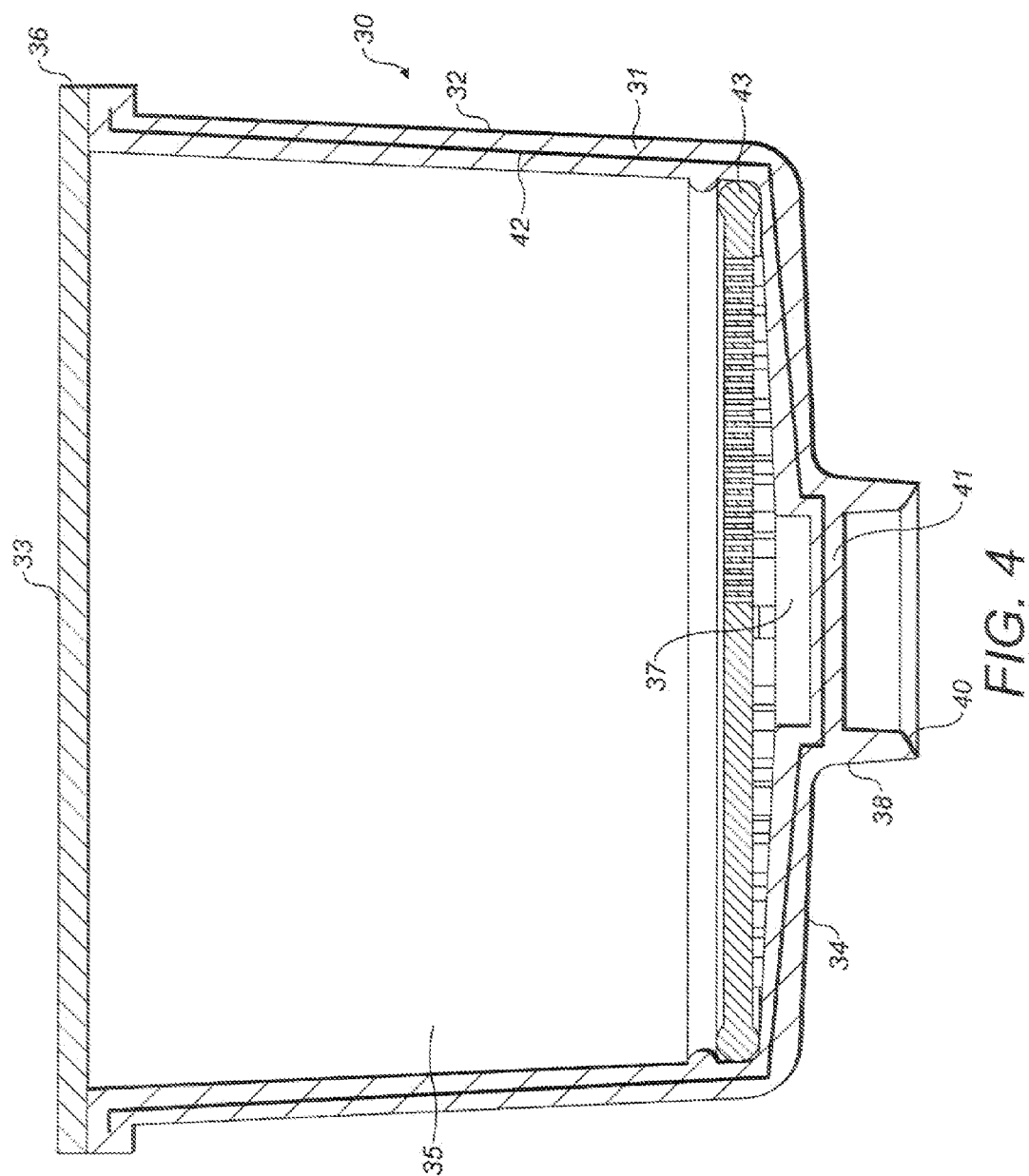
Figure 5:
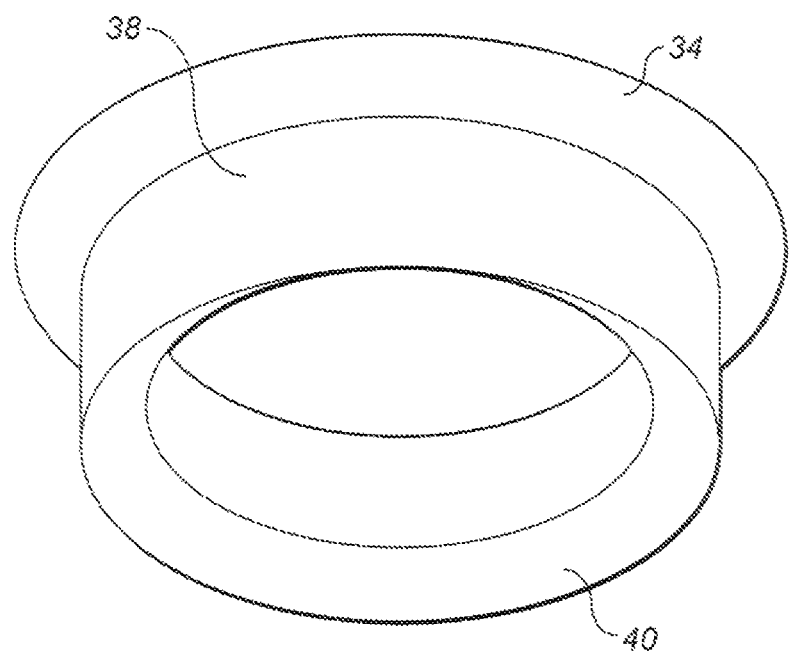

FIG. 2 illustrates a first version of a cartridge 30 which is designed for use in preparing products which require low pressure during the preparation process, such as chocolate, coffee, tea, sweeteners, cordials, flavourings, alcoholic beverages, flavoured milk, fruit juices, squashes, sauces and desserts. A typical range of "low" pressures used for the preparation of such products is 0.5 to 2 bar. FIG. 4 illustrates a second version of the cartridge 30 which is designed for use in preparing products which require high pressure during the preparation process, such as espresso-style products, where it is desirable to produce a crema. A typical range of "high" pressures used for the preparation of such products is 2 to 16 bar.

The overall shape of the cartridges 30 is generally circular or disc-shaped. Typically the overall diameter of the cartridges 30 is 45 mm±5 mm and the overall height is 40 mm±5 mm. Typically the volume of the cartridges 300, 320 when assembled is 50 ml±20% although this will vary according to the nature of the food or beverage ingredients contained therein.

The cartridges 30 typically comprise a first member 31, which generally comprises a bowl-shaped shell, having an annular wall 32, an open mouth and a base 34. The annular wall 32 and base 34 together define a receptacle having a chamber 35. Beverage or food ingredients 33 are placed in the chamber 35 (see FIG. 6) and the mouth is sealed with a second member 36 which provides a lid, using a suitable process, such as heat or ultrasonic welding.

In the middle of the base 34 is an outlet aperture 37, which is surrounded by an annular collar 38 which projects away from the base 34. The collar 38 of the low pressure cartridge 30 (FIG. 2) includes castellations 39 having gaps 39a therebetween. The collar 38 of the high pressure cartridge 30 (FIG. 4) is solid and has no such castellations 39. A lower surface 40 of the collar 38 is preferably at an inclined angle to the horizontal.

Prior to use the outlet aperture 37 is sealed by a septum 41, which is preferably integrally formed with the base 34.

Each member 31, 36 is formed as a single integral piece from high density polyethylene, polypropylene, polystyrene, polyester, or a laminate of two or more of these materials. A layer 42 of a gas impermeable material, such as EVOH, may be incorporated in the members 31, 36. A suitable process for manufacturing the members 31, 36 would be injection moulding.

The machine is preferably adapted to include a valve 50 located in the beverage/food product delivery outlet 20 to provide pressure control of the preparation process within the cartridge 30. The valve 50 preferably comprises a retainer 51 which is mounted in the delivery outlet 20. A lancet 52, or other type of piercing device, is attached to the retainer 51 at one end 53. The other end 54 of the lancet 52 is sharpened to provide means for piercing the septum 41. The lancet 52 may be provided with one or more grooves 55 extending from the sharpened end 54 along a portion of the outer surface of the lancet 52.

Located around the lancet 52, and moveable relative thereto, is a piston 56 having a central bore 57. The bore 57 is stepped, having a narrower section 58, through which the sharpened end 54 of the lancet 52 passes, extending towards the distal end 60 of the piston 56, and a wider section 59 extending towards the proximal end 61 of the piston 56. The resulting inward step provides a locating seat 62 for an end of a compression spring 63, which is also located around the lancet 52 within the wider section 59 of the piston bore 57. The other end of the spring 63 is mounted within the retainer 51, so as to bias the piston 56 away from the retainer 51 towards the top of the beverage delivery outlet 20. The bias of the spring 63 sets the breaking pressure of the valve 50.

As an alternative to the spring mechanism an elastomer may be used to bias the lancet 52.

The distal end 60 of the piston 56 comprises a radially extending flange 64. An upper surface 65 of the flange 64, or a portion thereof, may be angled downwardly (i.e. towards the perimeter of the flange 64), at substantially the same angle as that of the lower surface 40 of the collar 38. An angled surface is preferable to a horizontal surface as it has the ability to self centre the piston 56 and creates a better geometry for shearing the liquid to create foam.

Operation of the machine comprises insertion of a cartridge 30 into the cartridge holder of the brew head 17, carrying out the preparation cycle in which the beverage/food product is prepared and carrying out a dispense cycle in which the beverage/food product is dispensed, and removal of the (substantially) empty cartridge 30 from the machine.

Figure 6:
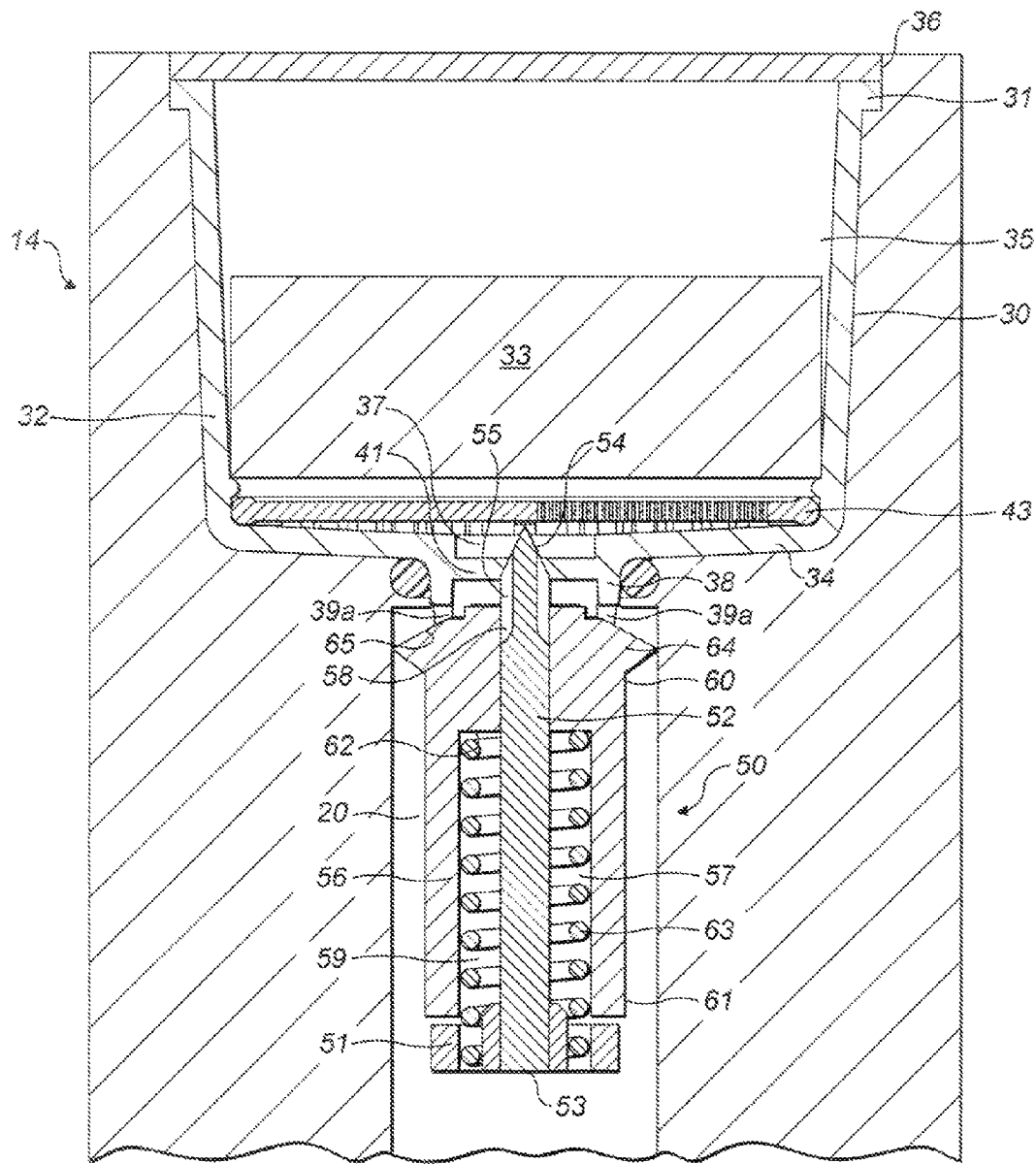
FIG. 6 is a cross sectional side elevation of the cartridge of FIG. 2 in a schematic representation of a part of a machine of the system of FIG. 1.

When the cartridge 30 is placed in the cartridge holder in the brew head 14, as shown schematically in FIG. 6, and the cartridge head closed, the lancet 52 is forced through the septum 41, thereby piercing it, and opening up the cartridge outlet aperture 37. The lower surface 40 of the collar 38 is forced into contact with the flange upper surface 65. The spring 63 biases the piston 56 into a "closed position" in contact with the collar 38 and maintains a good contact between the surfaces 40, 65.

The preparation cycle typically has four main stages, although not all of these are used for all beverage or food types:
1. Pre-wet
2. Pause
3. Brew stage
4. Purge In the pre-wet stage the cartridge 30 is charged with liquid under pressure from the reservoir 10 by means of the pump 11. An inlet piercer pierces the lid 36 to provide a flow path for the liquid to enter the cartridge and pass into the brew chamber 35, where it mixes with the ingredients 33 contained therein. The charging with liquid causes the ingredients in the chamber 35 to be wetted. The charging may take place at a "fast" flow rate, e.g. of 600 ml/min, or a "slow" flow rate, e.g. of 325 ml/min. A slow charging rate is particularly useful for cartridges 30 containing viscous liquid ingredients where the ingredients require some dilution before they are able to be pumped at a higher volume flow rate. The volume of liquid injected into the cartridge 30 is selected to ensure that liquid or beverage/food product does not exit the outlet aperture 37 during this stage.

The pause stage allows the ingredients to soak in the liquid injected during the pre-wet stage for a predetermined period of time. Both the pre-wetting and soaking stages are known to increase the yield of the extractibles from the ingredients and to improve the end flavour of the final product and soaking are particularly used where the ingredients are roast and ground coffee.

In the brew stage liquid is passed through the cartridge 30 in order to produce the beverage or food product from the ingredients 33. The temperature of the liquid is determined by the controller 17, which sends instructions to the heater 13 to heat the liquid passing from the reservoir 10 to the brew head 14. Liquid enters the cartridge 30 and then passes into the chamber 35 of the cartridge 30. Brewing and/or mixing of the product in the cartridge 30 occurs before the prepared beverage or food product exits the cartridge outlet, passes through the delivery outlet 20 and may be directed into a suitably placed receptacle 21.

The beverage or food product formed by passage of the liquid through the ingredients 33 passes out of the cartridge 30 through the outlet aperture 37 and down the lancet 52 to the other side of the pierced septum 41. The grooves 55 help to provide a fluid flow path through the pierced septum 41, especially where the septum 41 is made of a fairly stiff material so that the gap formed by the piercing is not much larger than the diameter of the lancet 52.

Figure 7:
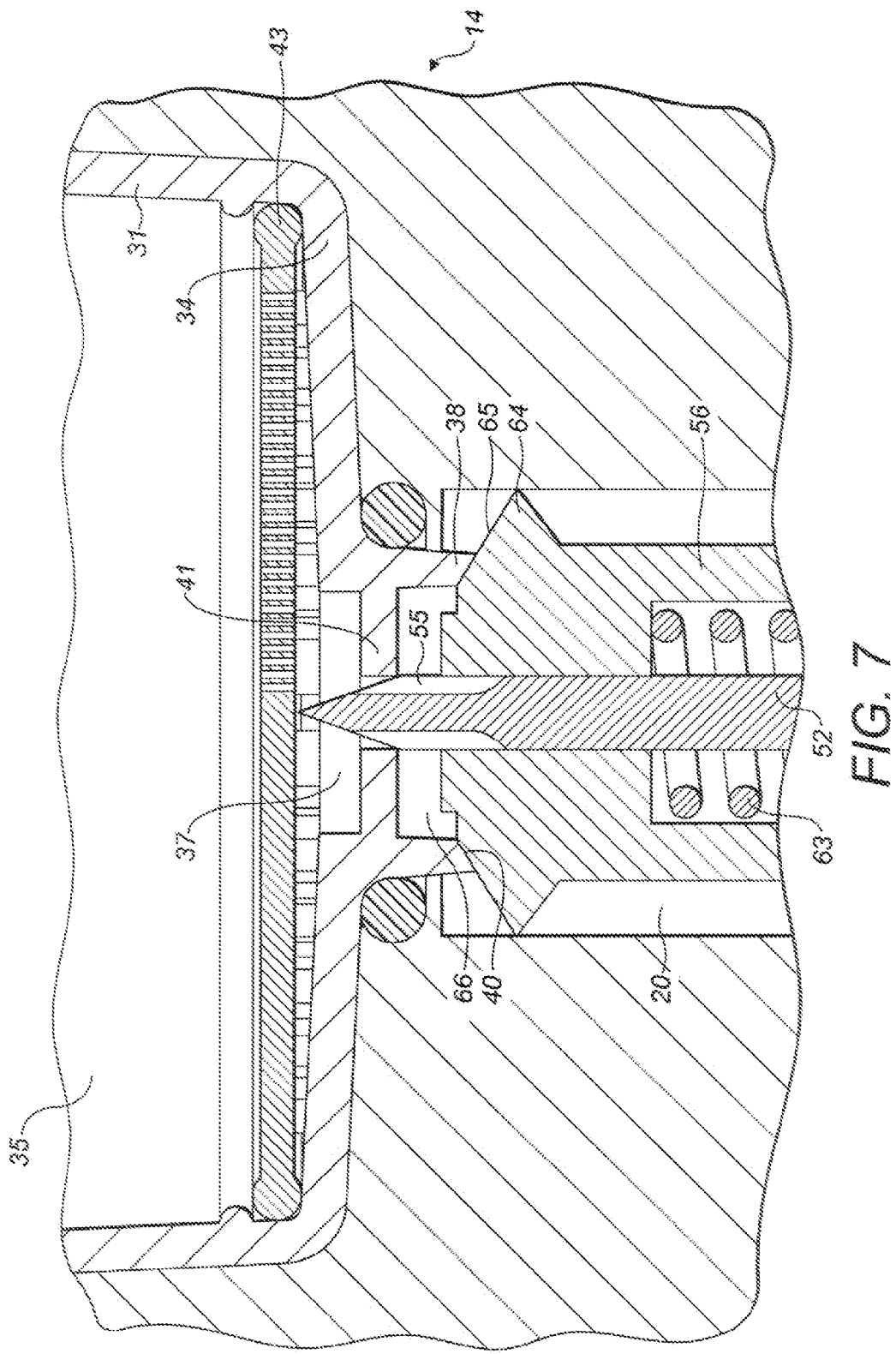
FIGS. 7 and 8 are cross sectional side elevations of the cartridge of FIG. 4 in a schematic representation of a part of a machine of the system of FIG. 1.

In the low pressure cartridge 30 (FIG. 7), the gaps 39a between the castellations 39 of the collar 38 provide passages for the beverage or food product to flow on through into the delivery outlet 37.

Figure 8:
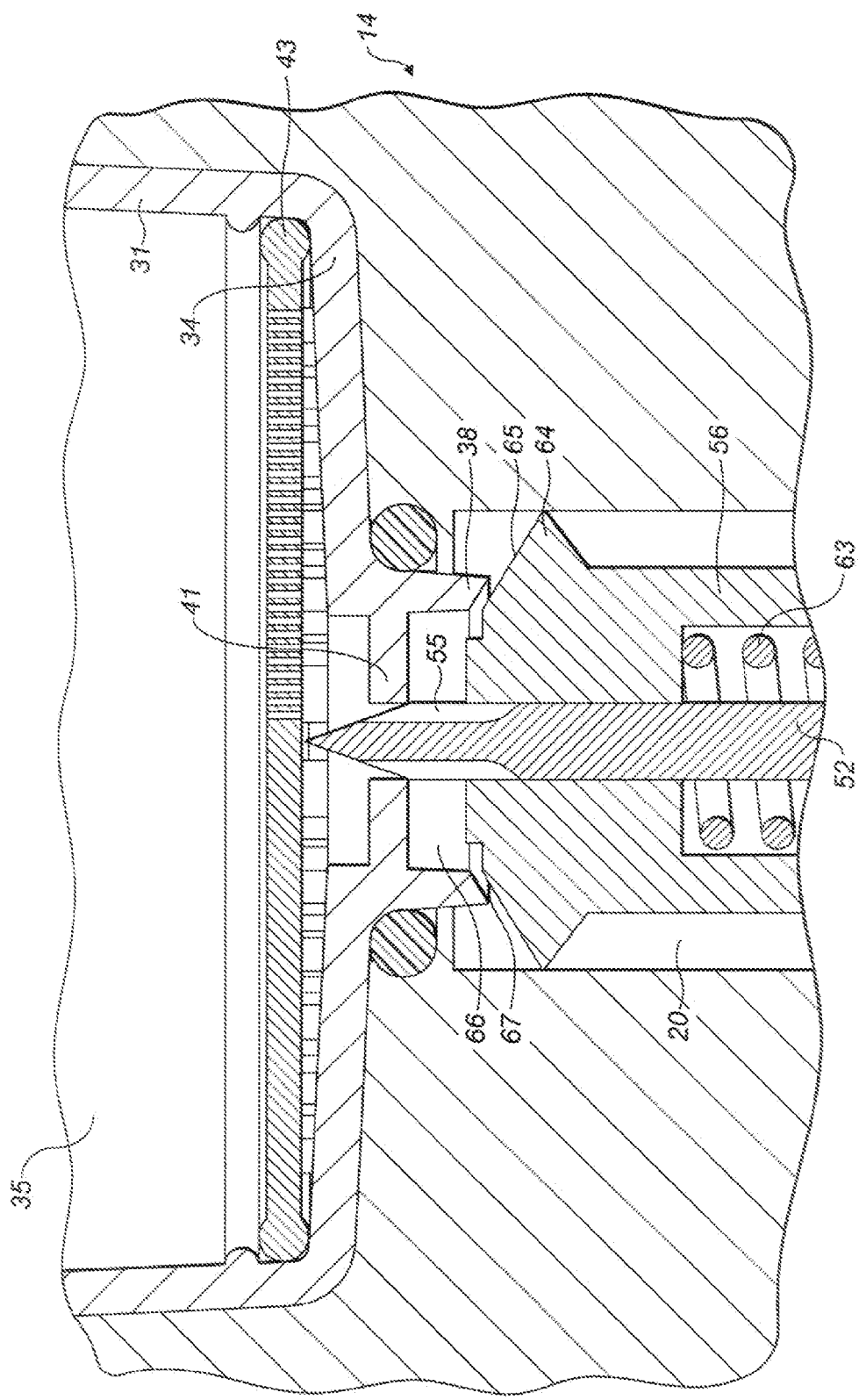

In the high pressure cartridge 30 (FIG. 8), there are no such gaps in the collar 38. Therefore as the beverage/food product flows through pierced septum 41 along the lancet 52, it collects initially in a chamber 66 which is formed by the side walls of the collar 38, the unpierced part of the septum 41 and the distal end 60 of the piston 56. This allows the pressure to build up inside the cartridge chamber 35. When the pressure is sufficient to overcome the spring force, the piston 56 is forced away from the collar 38 into an "open position" thereby opening a gap 67 between the surfaces 40, 65 (FIG. 8) to allow the beverage or food product to flow out into the delivery outlet 20.

During the purge cycle the temperature of the water heater 13 is raised sufficiently high to convert the liquid remaining in the system to steam and blowing the pressurised steam through the machine and the cartridge 30. This ensures that all beverage or food product is dispensed and that the flow path is cleared ready for dispensing another beverage or food product. The purge cycle may not commence immediately on cessation of the brew/mixing stage to allow for the majority of the fluid to clear the flow path.

Once the operating cycle has been completed, the machine automatically stops and the consumer removes the cartridge 30 by opening the cartridge holder and manually removing and disposing of the cartridge 30. Alternatively, the machine may be provided with an automatic ejection mechanism for removing the cartridge automatically on opening the cartridge holder.

The combination of the valve 50 and the external cartridge geometry, as provided by the collar 38, thus enables the machine 1 to produce a variety of beverages or food products, as it allows the cartridges 30 to be selectively prepared at either high or low pressure during the preparation cycle, depending on the type of cycle required for the ingredients 33 in the cartridge 300. However, unlike any of the prior art systems, the pressure required is identified by the external geometry of the cartridge 30 thus providing an automated variable pressure system. Such a machine is capable of producing beverages at a range of pressures, for example from 0 to 9 bar, and more preferably from 0 to 6 bar.

Alternative configurations for the collars 38 may be used. For the low pressure cartridge 30, the collar 38 need not be castellated, but may comprise one or more apertures, orifices or other form of gap in the side walls of the collar 38 which enables liquid to pass from the outlet aperture 37 to the delivery outlet 20.

In another embodiment, the spring loaded valve is incorporated in the cartridge collar 38, rather than in the machine. Suitable spring means may be used to bias the collar 38 into contact with the upper surface 65 of a fixed element which replaces the piston 56. When the requisite pressure in the chamber 66 is reached during the preparation process of a high pressure beverage or food product, the collar 38 is forced away from the fixed element, rather than the converse, to open the gap 67 between surfaces 40, 65.

The invention claimed is:

1. A machine for preparing beverage or food products from a cartridge containing one or more ingredients; said cartridge comprising a base, an outlet aperture in the base, and a collar extending from the cartridge base around the outlet aperture;
   said machine comprising a holding receptacle for receiving and holding a cartridge during the preparation process and a machine element;
   wherein the machine element comprises valve means formed downstream of the holding receptacle, which valve means opens at a predetermined pressure, and which machine element interacts with the collar of the cartridge when the cartridge is inserted into the holding receptacle;
   said cartridge collar being configured to determine the pressure in the cartridge during the preparation process by virtue of its interaction with the machine element.

2. A machine as claimed in claim 1 wherein said valve means comprise a piston normally biased into a closed position in which it is contactable with the collar of a cartridge inserted, in use, into the holding receptacle.

3. A machine as claimed in claim 1 wherein the valve means are formed by the collar of a cartridge inserted, in use, into the holding receptacle and normally biased into its first position in which it is contactable with an element of the machine.

4. A machine as claimed in claim 1 in which the valve means further comprise piercing means for piercing the cartridge when it is inserted into the holding receptacle.

5. A system for preparing beverage or food products comprising a machine as claimed in claim 1 and at least one cartridge comprising a base, an outlet aperture in the base, and a collar extending from the cartridge base around the outlet aperture.

6. A system as claimed in claim 5 in which the cartridge collar comprises one or more gaps.

7. A system as claimed in claim 6 in which the one or more gaps are formed by castellations in the cartridge collar.

8. A system as claimed in claim 5 in which the cartridge collar comprises no gaps.

9. A system as claimed in claim 5 in which the cartridge outlet aperture is sealed by sealing means prior to use.

10. A system as claimed in claim 5 in which the cartridge collar incorporates biasing means for biasing the collar into a first position in which the collar interacts with an element of the machine, such that when the bias is overcome the collar moves to a second position out of contact with an element of the machine.

11. A system as claimed in claim 6 in which the one or more gaps in the cartridge collar cause the valve to open at a first pressure.

12. A system as claimed in claim 8 in which the lack of gaps in the cartridge collar cause the valve to open at a second pressure.

13. A system as claimed in claim 11 in which the second pressure is higher than the first pressure.

14. A system as claimed in claim 2 in which the piston or the collar is biased by spring means into the closed position.

15. A system as claimed in claim 2 in which an upper surface of the piston or the fixed element contacts a lower surface of the cartridge collar when in the closed position.

16. A system as claimed in claim 15 in which at least a portion of the upper surface of the piston or the fixed element and of the lower surface of the cartridge collar are angled at substantially the same angle to the horizontal.

17. A system as claimed in claim 5 in which the piercing means are provided with at least one means to provide a liquid flow path such that when the cartridge sealing means has been pierced liquid is able to flow from an interior of the cartridge, along the piercing means and into a chamber formed by the collar the sealing means and the upper surface of the piston.

18. A system as claimed in claim 17 in which, when a pressure in the chamber is greater than the bias, the piston moves out of contact with the collar into an open position.

19. A system as claimed in claim 17 in which, when a pressure in the chamber is greater than the bias, the collar moves out of contact with the fixed element into an open position.

20. A method of preparing a beverage or food product using the system as claimed in claim 5 comprising the steps of:
   selecting a cartridge;
   inserting the cartridge into a holding receptacle of a machine for preparing beverage or food products;
   piercing the cartridge with the piercing means; and
   supplying a liquid to the holding receptacle so as to pass the liquid through the cartridge to form the beverage or food product.

21. A system as claimed in claim 7 in which the one or more gaps in the cartridge collar cause the valve to open at a first pressure.

22. A system as claimed in claim 12 in which the second pressure is higher than the first pressure.

* * * * *